No. 882,204. PATENTED MAR. 17, 1908.
M. E. & A. TH. LASSEN.
NEEDLE THREADER.
APPLICATION FILED NOV. 25, 1907.
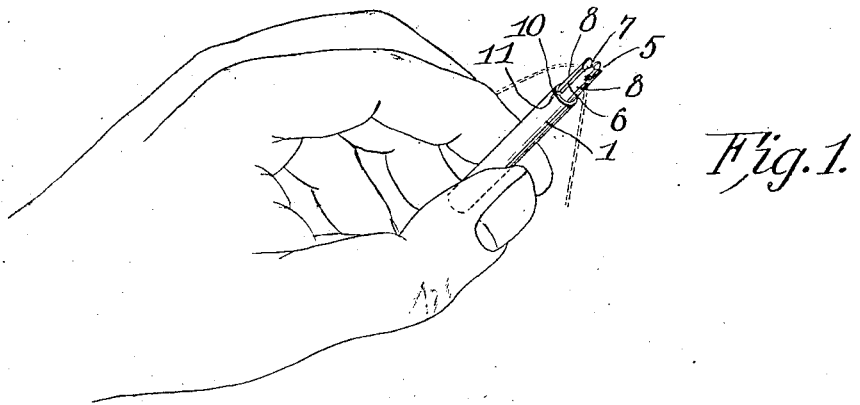
Fig. 1.
Fig. 2.
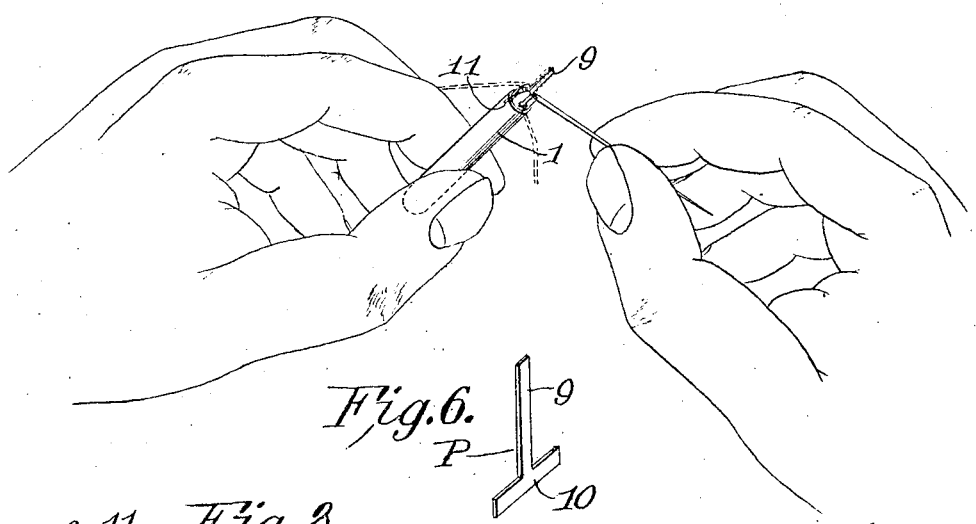
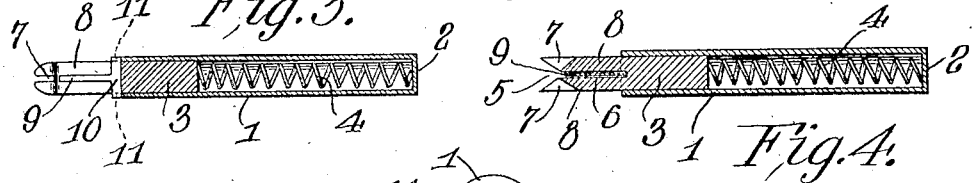
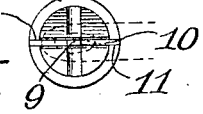
WITNESSES:
C. E. Smith.
Thos. V. Smith Jr.
INVENTORS
Max E. Lassen
and Anton T. Lassen,
By Wm. Bagger & Co., Attorneys.

UNITED STATES PATENT OFFICE.

MAX E. LASSEN, OF BROOKLYN, NEW YORK, AND ANTON TH. LASSEN, OF CHICAGO, ILLINOIS.

NEEDLE-THREADER.

No. 882,204.  Specification of Letters Patent.  Patented March 17, 1908.

Application filed November 25, 1907. Serial No. 403,721.

*To all whom it may concern:*

Be it known that we, MAX E. LASSEN and ANTON THORVALD LASSEN, subjects of the King of Denmark, residing respectively at Brooklyn, New York, and Chicago, Illinois, have invented certain new and useful Improvements in Needle-Threaders, of which the following is a specification.

This invention relates to devices for threading needles; and it has for its object to simplify and improve the construction and operation of this class of devices.

With these and other ends in view, which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention; it being, however, understood that no limitation is necessarily made to the precise structural details therein exhibited, but that changes, alterations and modifications within the scope of the invention may be resorted to, when desired.

In the drawing: Figure 1 is a perspective view of the improved needle threader, showing the end of a thread applied thereto previous to threading a needle. Fig. 2 is a perspective view, showing the device as it appears when the thread is pushed through the eye of the needle, the latter being shown in its proper relative position. Fig. 3 is a longitudinal sectional view of the improved needle threading device. Fig. 4 is a longitudinal sectional view taken at right angles to Fig. 3. Fig. 5 is an end view. Fig. 6 is a perspective detail view of the member which is used for pushing the thread through the needle eye.

Corresponding parts in the several figures are denoted by like characters of reference.

The improved needle threading device comprises a casing 1, consisting preferably of a cylindrical tube, closed at one end, as shown at 2.

Fitted in the open or outer end of the casing 1, for longitudinal movement in said casing, is a plunger 3, which is forced in an outward direction by the action of a coiled spring 4 which is seated in the inner end of the casing, bearing against the bottom or closed end of the latter. The outer end of the plunger 3 is provided with an angular or V-shaped notch 5, from the inner end of which a slot 6 extends in an inward direction; the notch 5 is intersected, preferably approximately at right angles, by a slot or notch 7, whereby the outer extremities of the prongs or fingers 8, 8 separated by the slot 6 are bifurcated; the bottom of the slot 7 is preferably inclined in opposite directions, toward the perimeter of the plunger, as will be clearly seen in Fig. 4 of the drawing.

P designates a pusher or tongue which consists of a T-shaped piece of steel or other suitable metal; said tongue being made extremely thin and slender so that the shank 9 thereof will readily pass through the eye of a fine needle, in addition to the doubled end of the thread which is to be pushed through the needle eye. The extremities of the head 10 of the tongue P are fitted and firmly secured in diametrically opposite notches 11 at the outer extremity of the tubular casing 1; said head 10 operating in the slot 6 of the plunger 3, which latter is thereby retained in position within the sleeve or casing 1; in such a manner, however, that the slotted portion of the plunger will be normally projected beyond the open end of the casing by the action of the spring 4 within the latter. It will be observed that the shank 9 of the tongue P is of a width at least equal to the width of the transverse slot 7; the slot 6 is of a width merely sufficient to accommodate the eye end of a needle.

The improved threading device is adapted for the purpose of threading ordinary sewing needles as well as the needles of sewing machines. In operation, the end of the thread is laid in the slot 7, and the eye end of the needle is disposed in the intersecting slot 6, with the eye facing the shank 9 of the tongue; by pressing or forcing the needle in an inward direction, or, conversely, by pressing the device against the needle, the plunger 3 will be forced inward within the casing against the tension of the spring 4, and the shank of the tongue will force the end of the thread through the eye of the needle, as will clearly appear by reference to Fig. 2 of the drawings, the thread being doubled upon the flat shank of the tongue; the needle is then separated from the threading device, the plunger of the latter being restored to normal position by the action of the spring, and the thread may then be drawn fully through the needle eye by the finger of the operator.

This improved threading device, as will be seen from the foregoing description, is extremely simple, and is capable of being easily manipulated with most satisfactory results. The construction is simple and inexpensive; the tongue may be firmly retained in the slots or notches 11 of the casing by simply pinching or compressing the material of which the latter is made upon the extremities of the head of the tongue; and the latter will thus serve to retain the plunger and the spring in the casing. The parts may thus be easily and efficiently assembled and the device may be manufactured at a small expense.

Having thus described the invention, what is claimed is:

1. In a needle threader, a tubular casing closed at one end, a spring actuated plunger slidable in said casing and provided at its outer extremity with a V-shaped notch and a slot extending inwardly therefrom, and an auxiliary shallow slot intersecting the first slot; and a T-shaped pusher or tongue having an outward extending shank, and a head secured in the casing and operating in the first mentioned slot of the plunger.

2. A needle threader comprising a tubular casing closed at one end, a plunger slidable in the open end of the casing and provided with intersecting slots at its outer extremity and with an angular notch communicating with one of the slots, a T-shaped tongue secured at the outer end of the casing and operating in one of the slots of the plunger, and a spring seated in the casing and forcing the plunger in an outward direction.

In testimony whereof we affix our signatures in presence of two witnesses.

MAX E. LASSEN.
ANTON TH. LASSEN

Witnesses as to Max E. Lassen:
GRACE CHARLES,
AUGUST C. HUCHTHAUSEN.

Witnesses as to Anton Th. Lassen:
ROBERT H. COWDREY,
ARTHUR G. HARLER.